United States Patent
Xiao

(10) Patent No.: US 12,000,704 B2
(45) Date of Patent: Jun. 4, 2024

(54) APPARATUS AND METHOD FOR PROCESSING A FLUID ZONE

(71) Applicant: Nokia Technologies Oy, Espoo (FI)

(72) Inventor: Zhen Xiao, Beijing (CN)

(73) Assignee: NOKIA TECHNOLOGIES OY, Espoo (FI)

(*) Notice: Subject to any disclaimer, the term of this patent is extended or adjusted under 35 U.S.C. 154(b) by 366 days.

(21) Appl. No.: 17/280,141

(22) PCT Filed: Oct. 15, 2018

(86) PCT No.: PCT/CN2018/110236
§ 371 (c)(1),
(2) Date: Mar. 25, 2021

(87) PCT Pub. No.: WO2020/077491
PCT Pub. Date: Apr. 23, 2020

(65) Prior Publication Data
US 2021/0341290 A1 Nov. 4, 2021

(51) Int. Cl.
*G01C 21/20* (2006.01)
*B63B 79/15* (2020.01)
(Continued)

(52) U.S. Cl.
CPC ............ *G01C 21/203* (2013.01); *B63B 79/15* (2020.01); *G01P 5/20* (2013.01); *B63G 11/00* (2013.01); *B64F 1/00* (2013.01)

(58) Field of Classification Search
CPC ...... G01C 21/20; G01C 21/203; B63B 79/15; G01P 5/20; B64F 1/00; B63G 11/00
(Continued)

(56) References Cited

U.S. PATENT DOCUMENTS

| | | | |
|---|---|---|---|
| 5,353,054 A | 10/1994 | Geiger | |
| 7,389,735 B2 * | 6/2008 | Kaji | B63B 21/00 114/230.1 |

(Continued)

FOREIGN PATENT DOCUMENTS

| | | |
|---|---|---|
| CN | 1846137 A | 10/2006 |
| CN | 102874398 A | 1/2013 |

(Continued)

OTHER PUBLICATIONS

A. Anwer, S. S. Azhar Ali, A. Khan and F. Mériaudeau, "Underwater 3-D Scene Reconstruction Using Kinect v2 Based on Physical Models for Refraction and Time of Flight Correction," in IEEE Access, vol. 5, pp. 15960-15970, 2017, doi: 10.1109/ACCESS.2017.2733003. (Year: 2017).*

(Continued)

*Primary Examiner* — Cuong H Nguyen
(74) *Attorney, Agent, or Firm* — SQUIRE PATTON BOGGS (US) LLP

(57) ABSTRACT

An apparatus (100) comprises at least one processor (110, 210,530,550,385) and at least one memory (120,220) including computer program code. The memory (120,220) and the processor (110,210,530,550,385) are configured to, in respect of a ground-supported or liquid-supported body (401,411) travelling or to travel through a fluid, receive a determined magnitude and direction of a current within a forthcoming fluid zone (410,420), the magnitude and direction of the current determined from particulates suspended in the forthcoming fluid zone (410,420), and process the determined magnitude and direction of the current to provide for at least one of: a change in one or more fluid dynamical properties of the body (401,411), or navigation control of the body (401,411).

20 Claims, 7 Drawing Sheets

(51) Int. Cl.
G01P 5/20 (2006.01)
B63G 11/00 (2006.01)
B64F 1/00 (2006.01)

(58) Field of Classification Search
USPC .............. 73/170.02, 170.03, 170.07, 170.11; 701/423; 435/287.1
See application file for complete search history.

(56) References Cited

U.S. PATENT DOCUMENTS

| | | | |
|---|---|---|---|
| 8,000,499 B2 | 8/2011 | Cichiello | |
| 8,120,908 B2 | 2/2012 | Arik et al. | |
| 8,279,423 B2 | 10/2012 | Shapira | |
| 8,508,721 B2 | 8/2013 | Cates et al. | |
| 8,695,686 B2 | 4/2014 | Sharma et al. | |
| 8,881,994 B2 | 11/2014 | Wetzel et al. | |
| 8,896,182 B2 | 11/2014 | Glaser et al. | |
| 8,984,938 B1* | 3/2015 | Bernhardt | G01P 5/20 73/170.04 |
| 9,233,837 B2 | 1/2016 | Arik et al. | |
| 2005/0029817 A1* | 2/2005 | Gizara | F03D 9/11 290/43 |
| 2008/0268469 A1* | 10/2008 | Srienc | G01N 15/1463 435/287.1 |
| 2016/0370263 A1 | 12/2016 | Duesterhoft et al. | |
| 2017/0113512 A1 | 4/2017 | Park et al. | |
| 2018/0243157 A1* | 8/2018 | Takada | G01C 17/28 |

FOREIGN PATENT DOCUMENTS

| | | | |
|---|---|---|---|
| CN | 103124909 A | 5/2013 | |
| CN | 105292379 A | 2/2016 | |
| CN | 105314081 A * | 2/2016 | ............. B63H 21/20 |
| CN | 205131576 U | 4/2016 | |
| CN | 206218176 U | 6/2017 | |
| CN | 108860638 A * | 11/2018 | ............. B63G 11/00 |
| DE | 19945852 A1 | 3/2000 | |
| WO | 2016/037236 A1 | 3/2016 | |
| WO | 2017/197524 A1 | 11/2017 | |

OTHER PUBLICATIONS

A translated version from Google Patent for Zhi-giang Hu et al CN 105314081 A (Year: 2016).*
A translated version from Google Patent for Feng-yin Zhao CN 108860638 A (Year: 2018).*
Zhao Feng-Yin, translated version of CN 108860638 A (Year: 2018).*
CN 105314081 A, translated version of by Hu et al (Year: 2016).*
Office action received for corresponding Chinese Patent Application No. 201880098715.1, dated Dec. 2, 2022, 6 pages of office action and no page of translation available.
Shrestha et al., "Computational Imaging With Multi-Camera Time-Of-Flight Systems", SIGGRAPH 2016, 2016, 11 pages.
"Time-of-flight camera", Wikipedia, Retrieved on Mar. 25, 2021, Webpage available at : https://en.wikipedia.org/wiki/Time%E2%80%90of%E2%80%90_flight_camera.
"Motorcycle Riding in Bad weather", Lazymotorbike, Retrieved on Mar. 25, 2021, Webpage available at : https://www.lazymotorbike.eu/tips/weather/.
"Supercomputers Help Design Better Golf Balls", ZDNet, Retrieved on Mar. 25, 2021, Webpage available at : https://www.zdnet.com/article/supercomputers-help-design-better-golf-balls/.
"The University of Science and Technology of China has developed a new type of wind measurement lidar", Ministry of Science and Technology of the People's Republic of China, Retrieved on Mar. 26, 2021, Webpage available at : http://www.most.gov.cn/dfkj/ah/zxdt/201611/t20161122_129061.htm.
"ZX 300M—Offshore wind Lidar", ZXLidars, Retrieved on Mar. 26, 2021, Webpage available at : https://www.zxlidars.com/wind-lidars/zx-300m/.
Cherukuru et al., "Augmented Reality Based Doppler Lidar Data Visualization: Promises and Challenges", EPJ Web of Conferences, The 27th International Laser Radar Conference (ILRC 27), vol. 119, 2016, pp. 1-3.
Merrison et al., "A Miniature Laser Anemometer for Measurement of Wind Speed and Dust Suspension on Mars", Planetary and Space Science, vol. 52, No. 13, Nov. 2004, pp. 1177-1186.
"Detecting Circles in Images using OpenCV and Hough Circles", Pyimagesearch, Retrieved on Mar. 25, 2021, Webpage available at : https://www.pyimagesearch.com/2014/07/21/detecting-circles-images-using-opencv-hough-circles/.
"Circle-Detection-in-Real-Time", Github, Retrieved on Mar. 25, 2021, Webpage available at : https://github.com/ShubhamCpp/Circle-Detection-in-Real-Time.
Cuevas et al., "Fast algorithm for Multiple-Circle detection on images using Learning Automata", IET Image Processing, vol. 6, No. 8, 2012, pp. 1-30.
"Tensorflow Model", Github, Retrieved on Mar. 25, 2021, Webpage available at : https://github.com/tensorflow/models.
Heide et al., "Doppler Time-Of-Flight Imaging", ACM Transactions on Graphics, vol. 34, No. 4, Aug. 2015, pp. 1-11.
International Search Report and Written Opinion received for corresponding Patent Cooperation Treaty Application No. PCT/CN2018/110236, dated Jul. 26, 2019, 10 pages.
Office action received for corresponding Japanese Patent Application No. 2021-519806, dated May 10, 2022, 2 pages of office action and 2 pages of translation available.
Segawa et al., "Active Control of Turbulence using Alternating Suction and Blowing Jets", Journal of Japan Society of Fluid Mechanics, vol. 25, No. 2, 2006, pp. 103-110.
"OPT8241—QVGA-Resolution 3D Time-of-Flight (ToF) Sensor", Texas Instruments, Retrieved on Apr. 11, 2021, Webpage available at : https://www.ti.com/product/OPT8241#:~:text=The%20OPT8241%20time%2Dof%2Dflight,programmable%20timing%20generator%20(TG).
"QinetiQ applies Wind Profiling Portable Radar for Accurate Single-Pass Airdrops", QinetiQ, Retrieved on Apr. 11, 2021, Webpage available at : https://www.qinetiq.com/en/news/qinetiq-applies-wind-profiling-portable-radar-for-accurate-single-pass-airdrops.

* cited by examiner

APPARATUS AND METHOD FOR PROCESSING A FLUID ZONE

TECHNICAL FIELD

The present disclosure relates to methods, apparatus, systems and computer programs for receiving and using information about a fluid through which a body is travelling or can travel.

BACKGROUND

It can be useful to have information about a fluid through which a body is travelling or can travel.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising:
  at least one processor; and
  at least one memory including computer program code;
  the at least one memory and the computer program code configured to, with the at least one processor, cause the apparatus to:
  in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and
  process the determined magnitude and direction of the current to provide for at least one of:
    (i) a change in one or more fluid dynamical properties of the body; or
    (ii) navigation control of the body.
The apparatus may be further configured to:
  determine the magnitude and direction of the current within the forthcoming fluid zone from the particulates suspended in the forthcoming fluid zone.

The determined magnitude and direction of the current may be determined using a time of flight camera to calculate the distance of the particulates from the body and the velocity of the particulates. The velocity of the particulates may be calculated using a Doppler time-of-flight calculation.

The particulates may be detected by identifying orbs within at least one captured image of the forthcoming fluid zone.

The determined magnitude and direction of the current within the forthcoming fluid zone may have been corrected for the travelling velocity of the body with respect to the ground or liquid.

The particulates may comprise at least one of dust, sand, soot, smog, sea spray, rain drops, plankton or marine microorganisms.

The fluid may comprise air or water.

The liquid-supported body may be floating on the liquid. The liquid-supported body may be submerged in the liquid.

The ground-supported body may be at least one of a passenger vehicle, a non-passenger vehicle, a motorcycle, or a construction crane.

The liquid-supported body may be at least one of a diver, a submarine or a boat.

The apparatus may be located in, on or is attached to the body.

The apparatus may be further configured to provide a computer-readable instruction to a controller to enable the controller to at least one of (i) change the one or more fluid dynamical properties of the body or (ii) perform navigation control of the body.

The apparatus may be further configured to change one or more fluid dynamical properties of the body. For example, the apparatus may be configured to change the shape of the body. The apparatus may be configured to change a surface of the body.

The apparatus may be further configured to perform navigation control of the body. For example, the apparatus may be configured to perform a steering control function.

The apparatus may be further configured to cause the presentation of visual, audio or tactile information about at least one of: the determined magnitude and direction of the current, a change in one or more fluid dynamical properties of the body, or navigation control of the body to enable a user to at least one of (i) change one or more fluid dynamical properties of the body or (ii) perform navigation control of the body.

The visual, audio or tactile information may be presented within an augmented reality setting.

In a second aspect, there is provided an apparatus comprising means for performing
  in respect of a ground-supported or liquid-supported body travelling or for travel through a fluid, receiving a determined magnitude and direction of a current within a forthcoming fluid zone, the magnitude and direction of the current determined from particulates suspended in the forthcoming fluid zone, and
  processing the determined magnitude and direction of the current to provide for at least one of:
    (i) a change in one or more fluid dynamical properties of the body; or
    (ii) navigation control of the body.

In a third aspect, there is provided a system configured to:
  in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and
  process the determined magnitude and direction of the current to provide for at least one of:
    (i) a change in one or more fluid dynamical properties of the body; or
    (ii) navigation control of the body.

The system may be further configured to perform each of the steps performable by the apparatus of the first aspect. It will be appreciated that different steps may be performed by different apparatus of the system.

In a fourth aspect, there is provided a computer-implemented method comprising:
  in respect of a ground-supported or liquid-supported body travelling or for travel through a fluid, receiving a determined magnitude and direction of a current within a forthcoming fluid zone, the magnitude and direction of the current determined from particulates suspended in the forthcoming fluid zone, and processing the determined magnitude and direction of the
current to provide for at least one of:
(i) a change in one or more fluid dynamical properties
of the body; or
(ii) navigation control of the body.

The method may further comprise performing any of the steps performable by the apparatus of the first aspect.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described examples.

For example, in a fifth aspect, there is provided a computer program configured to, when run on at least one processor, cause an apparatus or system to:

in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and process the determined magnitude and direction of the current to provide for at least one of:
(i) a change in one or more fluid dynamical properties of the body; or
(ii) navigation control of the body.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable medium, which may be a physical computer readable medium such as a disc or a memory device, may be a non-transitory medium, or may be embodied as a transient signal. Such a transient signal may be a network download, including an internet download.

For example, in a sixth aspect, there is provided a computer-readable medium having stored thereon computer program code configured to, when run on at least one processor, cause an apparatus or system to perform:

in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and process the determined magnitude and direction of the current to provide for at least one of:
(i) a change in one or more fluid dynamical properties of the body; or
(ii) navigation control of the body.

The present disclosure includes one or more corresponding aspects, examples or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

Some example embodiments will now be described with reference to the accompanying drawings, in which.

DETAILED DESCRIPTION

Figure 1:
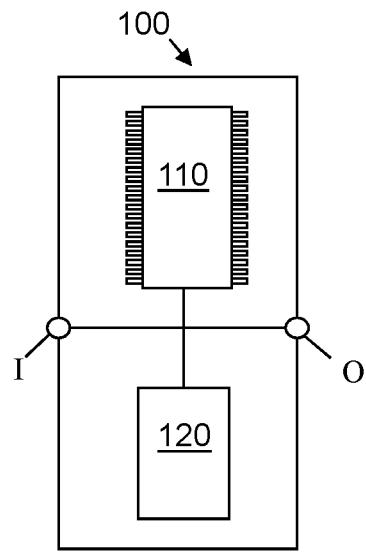
FIG. 1 shows an example apparatus according to the present disclosure.

FIG. 1 shows an apparatus 100 comprising a processor 110, memory 120, input I and output O. In this example only one processor and one memory are shown but it will be appreciated that other examples may utilise more than one processor and/or more than one memory (e.g. same or different processor/memory types). The apparatus 100 may be or may comprise an application specific integrated circuit (ASIC). The apparatus 100 may be or may comprise a field-programmable gate array (FPGA). The apparatus 100 may be a module for a device, a circuitry for the device, or may be the device itself, wherein the processor 110 is a general purpose CPU (Central Processing Unit) and the memory 120 comprises one or more memory units. Alternatively or additionally, the apparatus 100 may comprise one or more GPUs (Graphics Processing Unit), NPUs (Neural Network Processing Unit) and/or AI (Artificial Intelligence) accelerators.

The input I allows for receipt of signalling to the apparatus 100 from further components. In this example the input I and output O are part of a connection bus that allows for connection of the apparatus 100 to further components. The processor 110 is dedicated to executing/processing information received via the input I in accordance with instructions stored in the form of one or more computer program code on the memory 120. The output signalling generated by such operations from the processor 110 is provided onwards to further components via the output O.

The memory 120 unit is a computer readable medium (such as solid-state memory, a hard drive, ROM (Read-Only Memory), RAM (Random-Access Memory), Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the one or more computer program code stored on the memory 120.

In this example the input I, output O, processor 110 and memory 120 are electrically connected internally to allow for communication between the respective components I, O, 110, 120, which may be located proximate to one another as an ASIC. In this way the components I, O, 110, 120 may be integrated in a single chip/circuit/circuitry for installation in an electronic device. In other examples, one or more or all of the components may be located separately (for example, throughout a portable electronic device such as devices 200, 300, or within a network such as a "cloud" and/or may provide/support other functionality).

Figure 2:
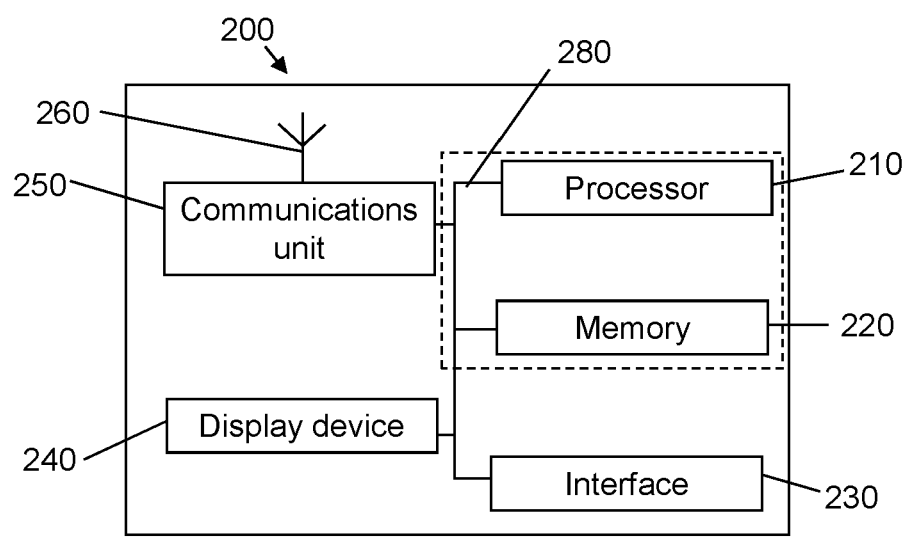
FIG. 2 illustrates another example apparatus according to the present disclosure.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box), for a mobile phone or PDA or audio/video player or the like. Such a module, apparatus or device may just comprise a suitably configured memory 120 and processor 110.

The example apparatus/device 200 comprises a display 240 such as, a Liquid Crystal Display (LCD), e-Ink, or touch-screen user interface (like a tablet PC). The device 200 is configured such that it may receive, include, and/or otherwise access data. For example, device 200 comprises one or more communications units 250 (such as a receiver, transmitter, and/or transceiver), in communication with one or more antennas 260 for connection to a wireless network and/or a port (not shown). Device 200 comprises one or more memory units 220 for storing data, which may be received via the one or more antennas 260 or a user interface 230. The processor 210 may receive data from the user interface 230, from the one or more memory units 220, or from the one or more communications units 250. Data may be output to a user of device 200 via the display device 240, and/or any other output devices provided with the apparatus. The processor 210 may also store the data for later user in the one or more memory units 220. The device contains components connected via communications bus 280.

The one or more communications units 250 can be, for example, a receiver, transmitter, and/or transceiver, that is in communication with the one or more antenna 260 for connecting to a wireless network and/or a port (not shown) for accepting a physical connection to a network, such that data may be received via one or more types of network. The communications (or data) bus 280 may provide active coupling between the processor 210 and the one or more memory units (or storage medium) 220 to allow the processor 210 to access the computer program code stored on the one or more memory units 220.

The one or more memory units 220 comprises computer program code in the same way as the memory 120 of apparatus 100, but may also comprise other data. The processor 210 may receive data from the user interface 230, from the one or more memory units 220, or from the one or more communications units 250. Regardless of the origin of the data, these data may be outputted to a user of device 200 via the display device 240, and/or any other output devices provided with apparatus. The processor 210 may also store the data for later user in the one or more memory units 220.

Figure 3:
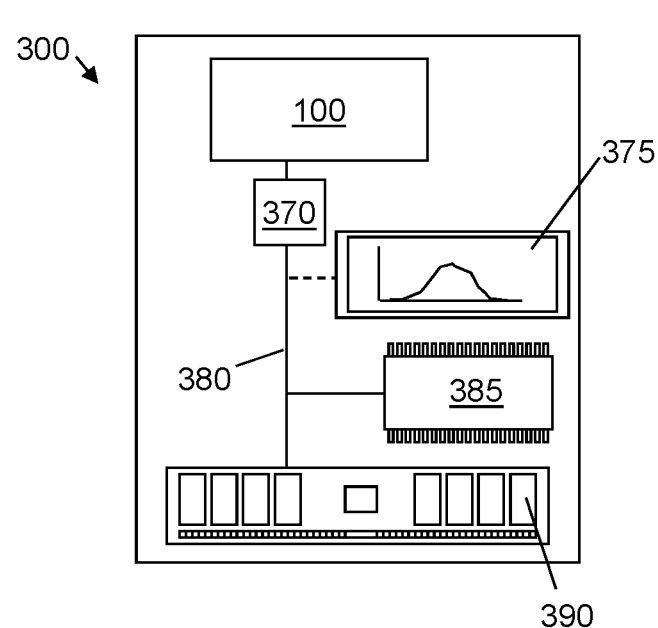
FIG. 3 illustrates a further example apparatus according to the present disclosure.

The device/apparatus 300 shown in FIG. 3 may be an electronic device such as a tablet personal computer, a portable electronic device, a portable telecommunications device, a wearable electronic device, a server or a module for such a device. The apparatus 100 can be provided as a module for device 300, or even as a processor/memory for the device 300 or a processor/memory for a module for such a device 300. The device 300 comprises a processor 385 and a storage medium 390, which are connected (e.g. electrically or wirelessly) by a data bus 380. This data bus 380 can provide an active coupling between the processor 385 and the storage medium 390 to allow the processor 385 to access the computer program code. It will be appreciated that the components (e.g. memory, processor) of the device/apparatus may be linked via cloud computing architecture. For example, the storage medium 390 may be a remote server accessed via the internet by the processor 385.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The processor 385 may also be configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random-access memory. The storage medium 390 may also be a permanent storage medium such as a hard disk drive, a flash memory, or a non-volatile random-access memory. The storage medium 390 could be composed of different combinations of the same or different memory types.

In a first aspect, the present disclosure relates to an apparatus (such as apparatus 100, 200, 300) comprising:
at least one processor; and
at least one memory including computer program code;
the at least one memory and the computer program code configured to, with the at least one processor, cause the apparatus to:
in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and process the determined magnitude and direction of the current to provide for at least one of:
(i) a change in one or more fluid dynamical properties of the body; or
(ii) navigation control of the body.

In this way, information about a fluid current in a zone around (e.g. ahead of, behind, above, below, to the side of) a body travelling or for travel through the fluid can be used to provide for navigation control of the body or to provide for a change in one or more fluid dynamical properties of the body.

It will be appreciated that a ground-supported body is a body which is in contact with the ground and whose weight is physically supported by the ground. Examples include ground vehicles (e.g. cars, motorbikes, buses, trains) (both autonomous and non-autonomous), the blades of a wind turbine, the payload being lifted by a crane, and a building. Similarly, a liquid-supported body is a body whose weight is physically supported by a liquid. The body could be floating on the liquid (e.g. a motorboat, a yacht, a canoe) or submerged within the liquid (e.g. a submarine, a diver).

Both ground-supported bodies and liquid-supported bodies can travel through (one or more) fluids, with the term "fluid" encompassing both liquids and gases. For example, a car being driven along a road is travelling through the air, a submerged submarine is travelling through water and a yacht sailing on a lake is travelling through both water and air.

The term "travelling" encompasses any relative motion between the body and the fluid. Thus, a ground-supported body is travelling through a fluid both when (i) the body is moving relative to the ground and relative to the fluid and (ii) the body is stationary relative to the ground and the fluid is moving relative to the ground and the body. For example, on a windy day a (stationary) building can be considered to be "travelling" with respect to the air.

Additionally, the term "travelling" means that at the time that the magnitude and direction for the current in the forthcoming fluid zone is determined, the body is moving relative to the fluid surrounding the body. The term "for travel" means that at the time that the magnitude and direction for the current in the forthcoming fluid zone is determined, the body is stationary with respect to the fluid surrounding the body, but that the body is nevertheless capable of moving through the fluid. For example, if there is no relative motion between a road vehicle waiting at traffic lights and the surrounding air, then the road vehicle is "for travel" thorough the air rather than "travelling". (There can of course be a detectable current (e.g. a crosswind) within a forthcoming fluid zone around (e.g. ahead of) the body, regardless of whether or not there is any relative motion between the fluid and the vehicle itself).

In some embodiments, information about the magnitude and direction of the current in the forthcoming fluid zone is used to determine whether or not a body for travel through a fluid should actually travel through the fluid. In some embodiments, the current in the forthcoming fluid zone may be considered 'not suitable' in some way and therefore the body may not actually travel. For example, it may be determined that the water current ahead of a diver is too dangerous, and the diver may therefore not start a dive. It may be determined that the air current ahead of a sailboard is too weak, and the sailboat may therefore not start a journey.

Figure 4A:
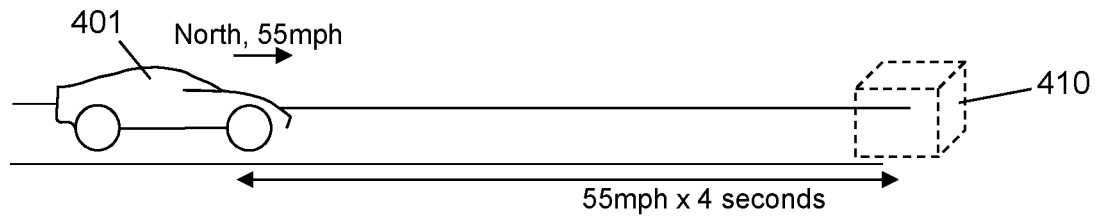
FIG. 4a illustrates schematically an example of a forthcoming fluid zone for a body according to the present disclosure.
Figure 4B:
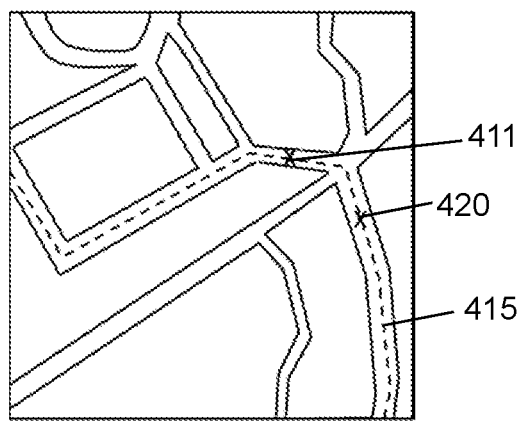
FIG. 4b illustrates schematically another example of a forthcoming fluid zone for a body according to the present disclosure.

FIGS. 4a and 4b show forthcoming fluid zones 410, 420 for bodies 401, 411 according to two embodiments of the present disclosure. For a particular ground-supported body or liquid-supported body, a forthcoming fluid zone is a zone (e.g. a two- or three-dimensional region) through which the body may be travelling in a short while (e.g. in one/two/four seconds time). In some embodiments, the forthcoming fluid zone is a zone through which the body is expected to be travelling in a short while, e.g. a zone on a planned route several seconds ahead of the body's current position.

The forthcoming fluid zone may be a zone ahead of, behind, above, below and/or to the side of the body, and accordingly a measurement system used to determine the magnitude and direction of the current in the forthcoming fluid zone may be positioned at the front of, back of, beneath, above and/or to the side of the body. For example, a measurement system may be placed on the back of a motorcycle to monitor for tailwinds, or on the side of the motorcycle to monitor for headwinds, crosswinds and tailwinds.

In some embodiments, a forthcoming fluid zone may be all of the imaging range of the measurement system used to determine the magnitude and direction of the current. For example, the entire imaging range as defined by the optical lens 544 of time-of-flight camera 540 in measurement system 500 (shown in FIG. 5) may be considered to be a forthcoming fluid zone, and a magnitude and direction of a current may be determined for the entire imaging range.

In other embodiments, a specific forthcoming fluid zone for a body can be determined. It may be less computationally demanding, e.g. in terms of processor and memory resources, to determine a magnitude and direction of a current for a smaller specifically-determined forthcoming fluid zone than for the entire imaging range of the measurement system. Various methods may be used to determine a forthcoming fluid zone for a body. In the embodiment shown in FIG. 4a, the current heading/orientation and speed of a vehicle 401 (due north and 55 mph) could be used to determine that a region located approximately 100 metres north of the vehicle (55 mph×4 seconds=98 metres) is a forthcoming fluid zone 410 for the vehicle 401. In the embodiment shown in FIG. 4b, a planned route 415 for vehicle 411 is used. For example forthcoming fluid zone 420 is located four seconds further along the planned route from the vehicle's current position. For a crane payload being lifted at 1 m/s, the forthcoming fluid zone could be a region 2 metres vertically above the payload's current position. For a stationary building in windy conditions, the measured wind direction and speed at the building could be used to determine the forthcoming fluid zone, or alternatively the expected wind direction and speed from a weather forecast could be used. It will be appreciated that the forthcoming fluid zone is a prediction of a fluid zone that the body is expected to be travelling through and that in reality the body may not pass through the zone, for example if the fluid currents or the body's travel path change unexpectedly.

A magnitude and direction of the fluid current in a forthcoming fluid zone can be determined from particulates suspended in the forthcoming fluid zone. In some embodiments, particulates are microscopic pieces of matter suspended within a fluid. In a gaseous fluid, particulates can include dust, sand, soot, smog, sea spray or raindrops, and in a liquid fluid, particulates can include dust, sand, plankton or marine microorganisms. Due to their small size and weight, the movement of particulate matter is very similar to the movement of the fluid in which they are suspended, and therefore the movement of particulate matter can be used to estimate or determine fluid movements. In particular, the velocity (i.e. speed and direction of motion) of particulates can be used to estimate the magnitude and direction of a fluid current.

In some embodiments, the magnitude and direction of the fluid current are determined for multiple spatial positions within the forthcoming fluid zone. In other embodiments, the magnitude and direction of the fluid current are determined for the spatial midpoint of the forthcoming fluid zone. In other embodiments, the determined values are an average of values from across the forthcoming fluid zone.

Figure 5:
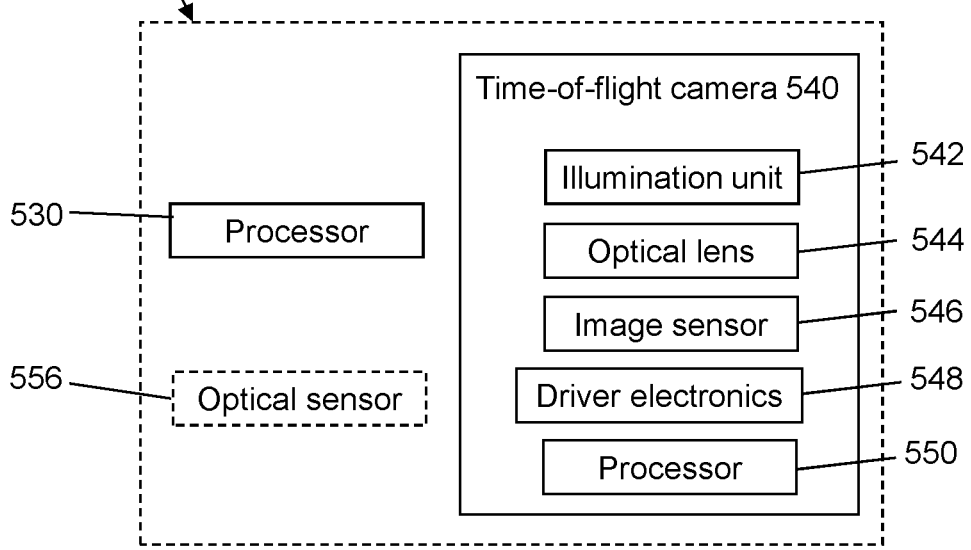
FIG. 5 illustrates schematically a measurement system used to determine a magnitude and direction of a fluid current according to one embodiment of the present disclosure.

FIG. 5 shows a measurement system 500 capable of determining a magnitude and direction of a current within a forthcoming fluid zone from particulates suspended in the forthcoming fluid zone, in accordance with one embodiment. The measurement system 500 includes a processor 530 and a time of flight camera 540.

A time of flight camera is a range-imaging camera system which calculates depth values using the speed of light and the measured time of flight of a light signal from a light source to and from the subject of each point of the imaged scene. A time of flight camera can capture a three-dimensional scene using a single light pulse (without, for example, requiring the camera to scan across the scene) and thus a range image can be formed and used in real-time (e.g. at a frame rate of over 30, over 50 or over 100 frames per second). Time of flight camera 540, as shown in FIG. 5, includes illumination unit 542, optical lens 544, image sensor 546, driver electronics 548 and processor 550. It will be appreciated that in some embodiments time-of-flight camera 540 could include more or fewer components, for example processors 530 and 550 may be the same processor, or a pre-existing lighting unit on the body may be used instead of illumination unit 540.

In use, the illumination unit 540 illuminates the scene with light (e.g. with a continuous wave or a single light pulse). In some embodiments, the illumination unit 540 may be a solid-state laser or an LED. In some embodiments, the illumination unit may operate in the near-infrared range (e.g. 750-1400 nm) invisible to the human eyes. Light is reflected from particulates suspended in front of the time of flight camera, and reflected light is gathered by lens 544 and directed to image sensor 546. Lens 544 defines the imaging range of the time-of-flight camera (e.g. 10-25 metres, 50-100 metres) and in some embodiments, lens 544 can be adjusted to change the imaging range of the time-of-flight camera. The image sensor 546 measures, at a plurality of pixels, the time the light has taken to travel from the illumination unit to the imaged particulate and back to the image sensor. Processor 550 uses the time of flight for the light pulse in combination with the speed of light to determine the distance of the imaged particulate from the camera. Further details about using a time-of-flight camera to image static scenes (e.g. equations for the distance to an imaged object) are given in section 3 of Heide, F. et al, *Doppler Time-Of-Flight Imaging*, ACM Trans. Graph. (SIGGRAPH).

The radial velocity of moving objects (i.e. the speed at which an imaged object is moving towards or away from a camera) can be determined by using a time-of-flight camera to image dynamic scenes, in combination with the Doppler effect. Further details are given in section 4 of Heide, F. et al, *Doppler Time-Of-Flight Imaging*, ACM Trans. Graph. (SIGGRAPH). As discussed in section 4.1 of Heide, F. et al, one heterodyne measurement and one homodyne measurement are required to determine the radial velocity. These can be acquired from a single time-of-flight camera by alternating rapidly between two modulation frequencies. Alternatively, these can be acquired from two synchronized time-of-flight image sensors having a common optical axis, with one of the sensors modulated at the same frequency as the illumination unit and the other modulated at a different frequency, or from other possible set-ups (and thus in some embodiments, measurement system 500 comprises two image sensors 546. In some embodiments measurement system 500 comprises two time-of-flight cameras 540). This Doppler-time-of-flight method of calculating radial velocity can be combined with known methods of calculating lateral velocity (e.g. optical flow methods) to give a three-dimensional velocity (Sections 1 and 7 of Heide, F. et al). In some embodiments, the lateral velocity is calculated using processor 530 and time of flight camera 540. In some embodiments, measurement system 500 includes separate means for calculating the lateral velocity of particulates in the forthcoming fluid zone.

It will be appreciated (e.g. from section 4.2 of Heide, F. et al) that range and radial velocity can be calculated simultaneously for objects in a dynamic scene. For example, the distance to and the radial velocity of an imaged particulate can be simultaneously calculated. This requires one heterodyne measurement and two homodyne measurements which can be acquired from a single time-of-flight camera, from multiple time-of-flight image sensors having a common optical axis, or from other possible set-ups.

In some embodiments, the magnitude and direction of the fluid current (e.g. as calculated using the Doppler-time-of-flight method above) can be corrected to take account of the travelling velocity of the body with respect to the fluid, prior to the magnitude/direction being received by apparatus 100. For example, if the body is a bicycle travelling at 15 mph (relative to the ground) and the Doppler calculation determines that particulates are moving at 25 mph towards the bicycle, then the corrected magnitude of the current would be 10 mph towards the bicycle (relative to the ground).

In some embodiments, the measurement system 500 may include an optical sensor 556 in addition to the image sensor 546 in the range-imaging time-of-flight camera 540. The optical sensor 556 and the image sensor 546 may share optical lens 544 or light may be directed to the optical sensor 556 by a different lens. The optical sensor 556 is used to capture an optical image of the forthcoming fluid zone, and from this captured image suspended particulates can be distinguished from other other objects (e.g. insects, birds, trees) in the forthcoming fluid zone. The particulates (e.g. dust, smog, plankton) create characteristic artefacts in the captured image, appearing as round objects with translucent halos (known as "orbs"). Thus, the identification of orbs (e.g. by using image analysis techniques or machine leaning algorithms in real-time) within at least one captured image of the forthcoming fluid zone can be used by the measurement system to identify suspended particulates. The positions of the identified particulates can be used by the time of flight camera 540 to ensure that the current magnitude and direction are determined by performing a Doppler-time-of-flight calculation on suspended particulates only, and not on other objects in the forthcoming fluid zone.

Measurement system 500 can be a physically compact system requiring no moving parts. Due to its compact size, the measurement system 500 can be located in, on or attached to any suitable body intended to travel through a fluid having particulates suspended therein, in order to determine the current within a forthcoming fluid zone for the body. To give some examples, the measurement system 500 can be fitted on to a motorcycle, car, sailboat, the blades of a wind turbine, or a diver's helmet.

In some embodiments, the apparatus 100 may also be located in, on or is attached to the body. For example, the apparatus may be an in-vehicle controller of an autonomous vehicle or an onboard computer on a motorcycle. In some embodiments, the measurement system 500 may be part of apparatus 100. That is, apparatus 100 can include two time-of-flight cameras 540 and processor 530. In other embodiments, the measurement system 500 and apparatus 100 are separate.

Following the determination of the magnitude and direction of the current (e.g. by measurement system 500), apparatus 100 receives the determined magnitude and direction of the current in the forthcoming fluid zone. In some embodiments, the apparatus 100 may itself have determined the magnitude and direction. In other embodiments, a different apparatus may have determined the magnitude and direction and then sent the magnitude/direction to the apparatus 100.

Once the apparatus 100 has received the determined magnitude and direction of the current, the apparatus 100 processes the determined magnitude and direction of the current to provide for at least one of (i) a change in one or more fluid dynamical properties of the body, or (ii) navigation control of the body.

The phrase "at least one of A or B" should be interpreted as encompassing each of (a) A only, (b) B only, and (c) both A and B. Thus in some embodiments the apparatus provides for a change in one or more fluid dynamical properties of the body, but does not provide for navigation control of the body; in some other embodiments, the apparatus provides for a navigation control of the body but does not provide for a change in one or more fluid dynamical properties of the body; in other embodiments, the apparatus provides for both a change in one or more fluid dynamical properties of the body and navigation control of the body.

Various examples of navigation control can be envisaged and are within the scope of the present disclosure. In some embodiments, navigation control of the body includes steering the body, for example to counteract one or more effects of the fluid current or to act in conjunction with the fluid current. A motorcycle rider may lean into a crosswind to counteract the lateral force of the crosswind, or a kayaker may adjust the rudder of their kayak to avoid being blown off-course by a water and/or wind current in a forthcoming fluid zone. Conversely, a sailboat could take advantage of a wind current in a forthcoming fluid zone in order to change course. In some embodiments, navigation control of the body includes changing the speed of the body. For example, a moving crane payload may be slowed down or stopped entirely (i.e. speed reduced to 0 m/s) if high wind speeds are detected in the forthcoming fluid zone. In some embodiments, navigation control involves changing the power output of the body to increase, maintain or decrease the speed of the body. For example, if a tailwind of 5 mph is detected in the forthcoming fluid zone for a motorcycle and the rider wishes to maintain a steady speed, then the power output of the motorcycle may be decreased slightly. In some embodiments, navigation control of the body includes determining that the body should not move. For example, a stationary crane payload may be kept stationary (i.e. speed maintained at 0 m/s) if high wind speeds are detected in the forthcoming fluid zone. A diver may decide not to begin a dive if dangerously high water currents are detected.

Various examples of changing one or more fluid dynamical properties of the body can be envisaged and are within the scope of the present disclosure. In some embodiments, changing one or more fluid dynamical properties of the body involves changing the shape of the body. In some embodiments, changing one or more fluid dynamical properties of the body involves changing the surface of the body. Other methods of changing one or more fluid dynamical properties of the body can be envisaged and are within the scope of the present disclosure (as are methods of changing the shape of the body other than those described below, and methods of changing the surface of the body other than those disclosed below).

As an example of changing the shape of the body, consider a motorcycle driving along a road. Changing the shape of the windward-side of the motorcycle can alter the effect of wind on the movement of the motorcycle. One method of changing the shape of a motorcycle is to rotate the windshield (e.g. about a yaw axis or a pitch axis). Rotating the windshield so as to reduce the surface area of the windshield facing into the wind direction reduces the air resistance of the windshield and stabilizes the body of the motorcycle. As another example of changing the shape of the body, consider a (stationary) building on a windy day. The shape of the corners of the building could be changed (e.g. to be curved in one direction or another) in order to reduce the air turbulence caused by the air passing the corner.

Figure 6:
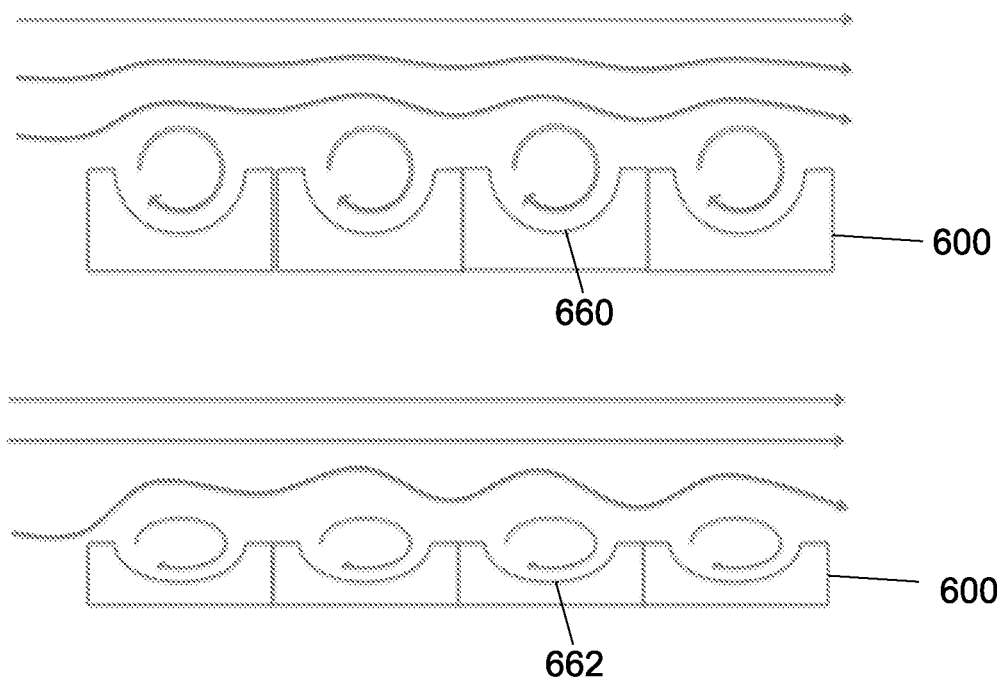
FIG. 6 illustrates schematically an example of an apparatus which can be used to cause a change in one or more fluid dynamical properties of the body according to the present disclosure.

A change to the surface of the body can change the frictional resistance between the body surface and the fluid (e.g. in terms of magnitude and/or shape), thereby changing one or more fluid dynamical properties of the body. Two example methods of changing the surface of a body are described below with reference to FIGS. 6 and 7a-7g. FIG. 6 shows a film 600 that could be used to change the surface of a body (and thus change one or more fluid dynamical properties of the body) in accordance with one embodiment. To continue with the motorcycle example, it will be appreciated that a crosswind produces a lateral force on the motorcycle which can be dangerous and destabilising for the rider. This crosswind force can be counteracted by generating a lateral force in the other direction. By Bernoulli's theorem, a pressure difference between the two sides of the motorcycle (and thus a lateral force) can be produced if the speed of air flow past the side of the motorcycle is different for the two sides. Film 600 can be positioned on one or more sides of the motorcycle and used to create different air flow speeds for different sides of the motorcycle. Film 600 is flexible and elastic (e.g. a silicone or rubber film) with a number of pits 660, 662 on its surface (similar to the surface of a golf ball). When air is flowing over the surface of film 600, a layer of surface turbulence is created due to the presence of the pits 660, 662. When the elastic film 600 is tautened, the pits become shallower 662 (e.g. 0.1-0.5 mm in depth), reducing the depth of the layer of surface turbulence (e.g. to 0.2-1 mm in depth) and reducing the air resistance of the surface. Conversely, when the elastic film is relaxed, the pits become deeper 660 (e.g. 0.2-1 mm in depth), increasing the depth of the layer of surface turbulence (e.g. to 0.4-2 mm in depth) and increasing the air resistance of the surface. By tightening/relaxing film 600 on one or more sides of the motorcycle (e.g. by tightening the films differently on the two sides of the motorcycle), different frictional resistances can be created on the two sides of the motorcycle leading to different air flow speeds for the two sides. This creates a pressure difference between the two sides, and hence a lateral force which can counteract the lateral force produced by a crosswind.

Figure 7B:
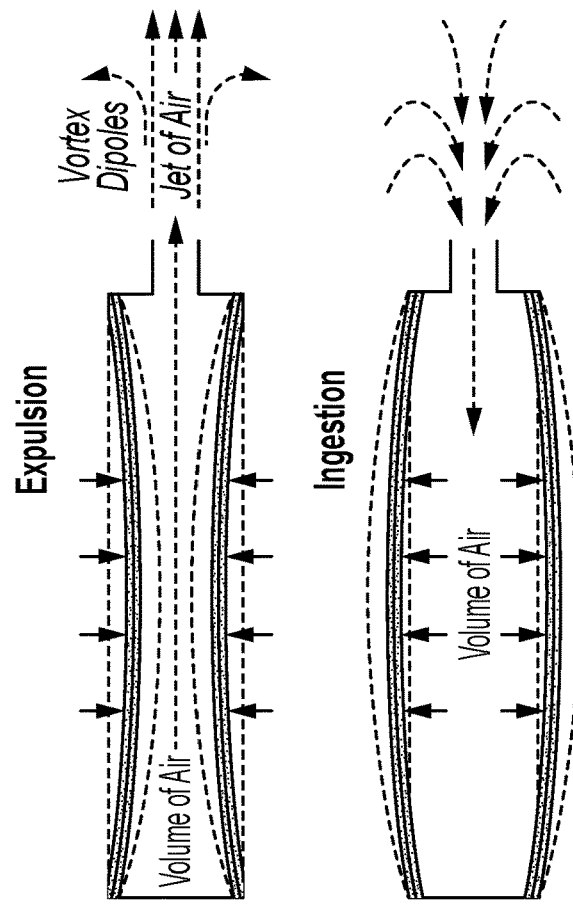
FIG. 7b illustrates an example of an apparatus which can be used to cause a change in one or more fluid dynamical properties of the body according to the present disclosure.
Figure 7A:
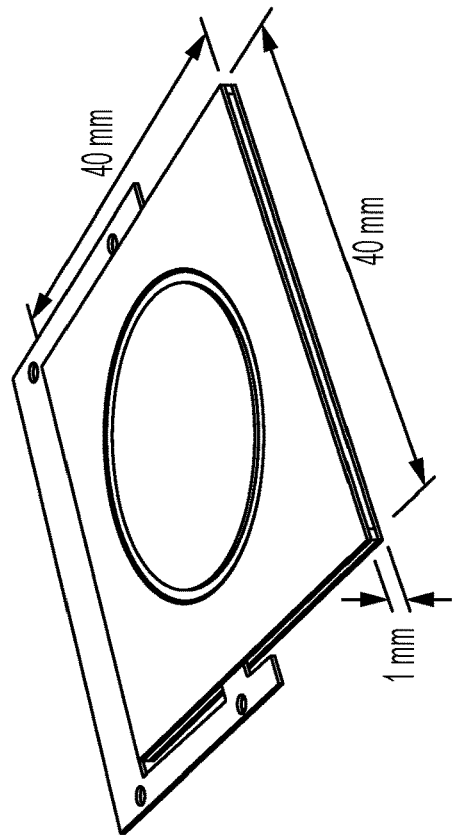
FIG. 7a illustrates an example of an apparatus which can be used to cause a change in one or more fluid dynamical properties of the body according to the present disclosure.

As illustrated in FIGS. 7a-7g, the surface of the body can be changed using dual piezoelectric cooling jets (DCJs) positioned on/at the surface of the body in accordance with one embodiment. As shown in FIG. 7a, a dual piezoelectric cooling jet is formed of two shims (e.g. 40 mm in length and width, 1 mm in height) each containing a piezoelectric element. The two shims are substantially parallel and are connected around the edges of each shim, other than at a small open fluid outlet region. By supplying an AC current to the DCJ (e.g. with a frequency around 100-200 Hz), the two shims are caused to physically expand and compress. With each expansion of the shims, the region between the shims is compressed and fluid is expelled from this region out of the fluid outlet, forming a focused jet of fluid as shown in FIG. 7b.

For a body travelling through a fluid and having a DCJ positioned on/at its surface, the DCJ acts as a vortex generator (regardless of whether or not an AC current has been supplied to the DCJ). The turbulent flow at the created vortex reduces the amount of slow-moving laminar boundary layer in contact with the body's surface, delaying local flow separation and thus reducing fluid drag on the body. In addition, when an AC current is supplied the DCJ creates a focused jet of fluid in the direction of the fluid outlet. This jet of fluid can affect (e.g. increase or decrease) the amount of turbulence in the region of fluid around the fluid outlet and according the fluid drag on the body can be affected. Thus, by selectively supplying a DCJ with AC current, the DCJ can be used to produce a dynamically controllable fluid flow at the surface of a body which affects the amount of fluid drag experienced by the body. The effect of the jet of fluid can depend on the direction of the fluid jet relative to the direction of fluid motion relative to the body. For example, when the jet of fluid is substantially parallel to the surface of the body and in the same direction as the direction of fluid motion relative to the body, the jet of fluid can create more turbulent flow, further reducing the amount of slow-moving laminar boundary layer in contact with the body's surface, delaying local flow separation and reducing fluid drag on the body. In some embodiments, the DCJ can be specifically positioned on the body such that the fluid outlet has a particular orientation with respect to an expected direction of fluid motion relative to the body in order to have a particular effect on the fluid drag (e.g. orientated in the same direction to decrease fluid drag or orientated in the opposite direction to increase fluid drag).

An array of DCJs can also be used to provide dynamically controllable fluid flows at the surface of a body and to affect the amount of fluid drag experienced by the body. Similarly to the single-DCJ scenario above, when the body is travelling through a fluid each of the array of DCJs acts as a vortex generator and a layer of surface turbulence is created. When an AC current is supplied to a plurality of DCJs in the array, a plurality of jets of fluid are created over the body's surface. This can further affect (e.g. increase or decrease) the amount of turbulence in the region of fluid around the fluid outlet, and according the fluid drag on the body can be affected. In some embodiments, the array of DCJs can be arranged on the surface of a body in a particular pattern in order to affect fluid drag on the body in particular ways. For example, the fluid outlet of each DCJ may be orientated in the same direction as an expected direction of fluid motion relative to the body in order to decrease fluid drag, or conversely orientated in the opposite direction in order to increase fluid drag. As another example, the fluid outlet of a plurality of the DCJs may be orientated in different directions (e.g. the DCJs may be arranged in a circle with fluid outlets pointing out of the circle) so that fluid jets in any direction can be created. As another example, the DCJs may be arranged so that their fluid outlets have varying angles of inclination with respect to the surface of the body. In some situations, jets of fluid directed away from the surface of the body may have a greater effect on fluid turbulence than jets of fluid substantially along the surface of the body (or vice-versa).

Figure 7C:
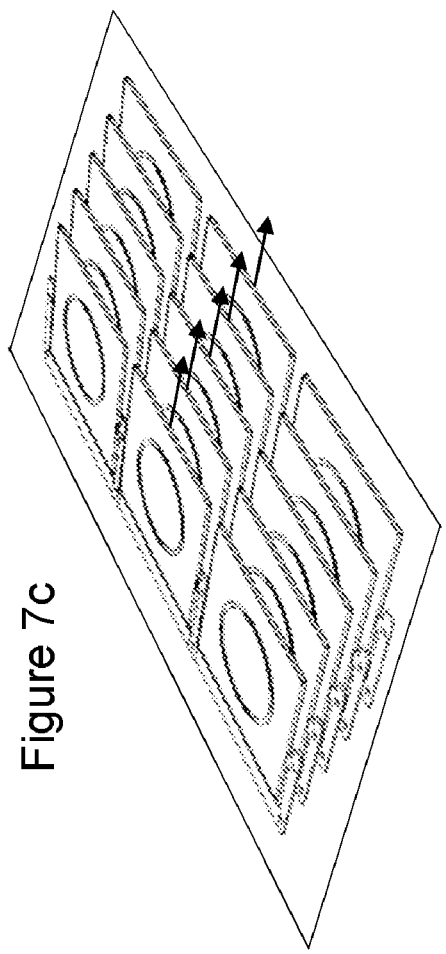
FIGS. 7c, 7d and 7e illustrate examples of apparatus which can be used to cause a change in one or more fluid dynamical properties of the body according to the present disclosure.
Figure 7E:
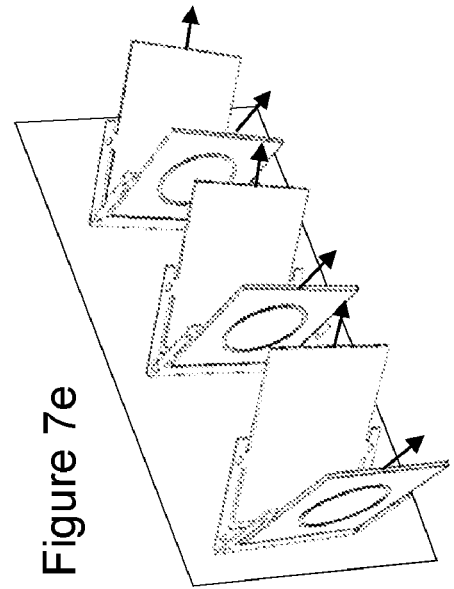
Figure 7D:
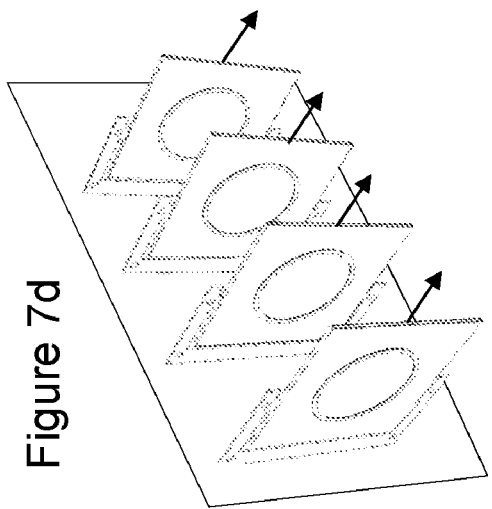

FIGS. 7c-7e show three examples of DCJ arrays usable to provide dynamically controllable fluid flows at the surface of a body, with arrows indicating the directions of the jets of fluid created by the respective DCJs. FIG. 7c shows an array of DCJs in an overlapping tiled formation with the flat face of each DCJ inclined at a small angle to the surface of the body (e.g. within 5 degrees, 20 degrees). When an AC current is supplied to a plurality of DCJs in the array, a plurality of jets of fluid are formed inclined at a small angle to the surface of the body (e.g. within 5 degrees, 20 degrees). The array of FIG. 7c might be used, for example, when the direction of fluid motion relative to the body is strongly expected to be in one direction and not the other, or when a flat and unobtrusive appearance is desired. FIG. 7d shows an array of DCJs arranged with their flat faces substantially perpendicular to the surface of the body (e.g. within 5 degrees of perpendicular) and capable of forming jets of fluid in a direction substantially perpendicular to the surface of the body. The array of FIG. 7d might be used, for example, when there is no expected direction of fluid motion relative to the body, or when thick laminar boundary layers are expected. FIG. 7e shows an array of paired DCJs. For each pair, the flat faces of the first and second DCJs are each close to perpendicular to the surface of the body (e.g. within 15 or 30 degrees of perpendicular) but each is offset from perpendicular in a different direction. Jets of fluid can therefore be dynamically and controllably formed in two different directions (each being substantially perpendicular to the surface of the body) depending on which of the DCJs are supplied with AC current.

Figure 7G:
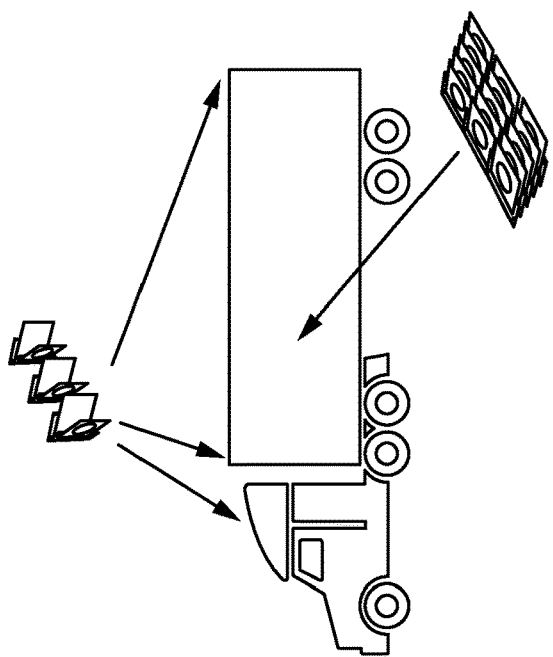
FIGS. 7f and 7g illustrate examples of the application of the apparatus shown in FIGS. 7c-7e to bodies according to the present disclosure.
Figure 7F:
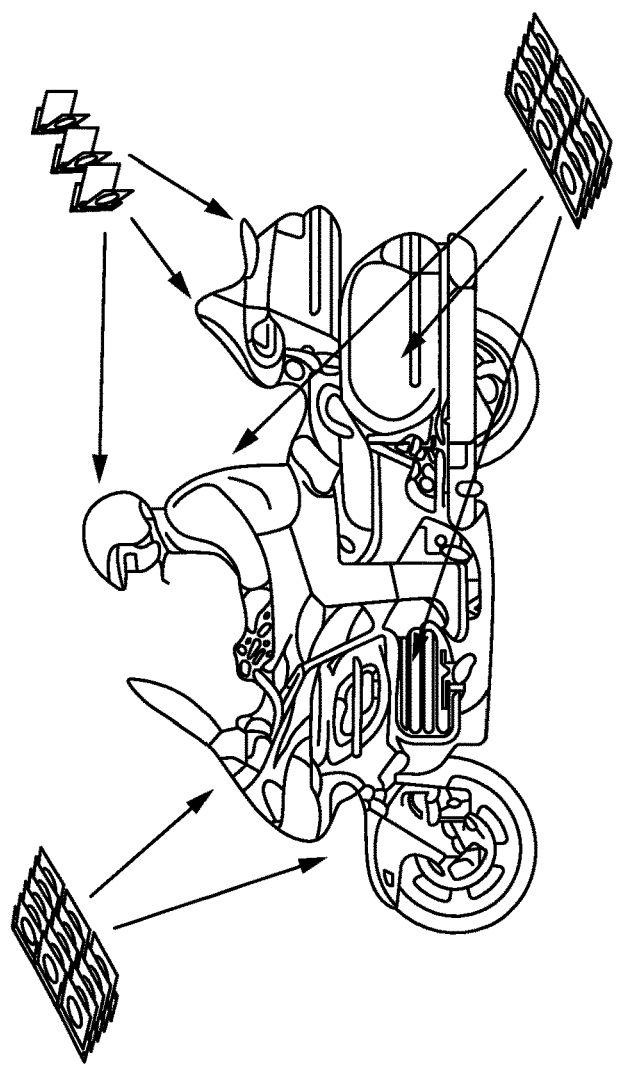

DCJ arrays can be arranged on various bodies in various positions, and different types of arrays could be used depending on the desired change in fluid dynamical property. For example, DCJ arrays could be positioned at the front, sides and/or rear of a motorcycle body as well as on the helmet and/or clothing of the rider (as shown in FIG. 7f). DCJ arrays could also be positioned at edges or sides of a lorry's body (as shown in FIG. 7g). DCJ arrays could be positioned on opposite sides of a body and used to increase the fluid drag on one side and decrease the fluid drag on the other side (in a similar manner to film 600 shown in FIG. 6). It will be appreciated that DCJs can be installed on pre-existing bodies (e.g. motorcycles, cars, lorries) to dynamically improve the fluid dynamical properties of the body.

In some embodiments, the apparatus 100 provides for navigation control and/or for a change in one or more fluid dynamical properties of the body by providing a direct computer-readable instruction to a control apparatus. For example, the apparatus could transmit a navigation control instruction to the controller of an autonomous vehicle to instruct it to steer slightly to the left to counteract one or more effects of an air current blowing to the right. The apparatus could transmit a control instruction to the controller of a motorcycle to instruct it to change a fluid dynamical property by rotating the windshield in a particular direction.

In other embodiments, the apparatus 100 provides for navigation control and/or for a change in one or more fluid dynamical properties of the body by providing information that could be used by a human user to make a decision about navigation control and/or changing one or more fluid dynamical properties of the body. In some embodiments, apparatus 100 does this by causing the presentation of at least one of visual, audio or tactile information about at least one of the determined magnitude and direction of the current, a change in one or more fluid dynamical properties of the body, or navigation control of the body, to enable a user to at least one of (i) change one or more fluid dynamical properties of the body or (ii) perform navigation control of the body. As previously mentioned, apparatus 100 may be located with the body or remotely located. Various embodiments of presentation of at least one of visual, audio or tactile information can be envisaged and are within the scope of the present disclosure. For example, apparatus 100 may cause the magnitude and direction of the wind field ahead of a car to be audibly described (e.g. in the car or remotely). In another example, apparatus 100 may cause a visual representation of the wind field to be presented on an in-vehicle computer screen, on the dashboard of the car, or remotely. The direction of the current can be represented by flow lines or a spatial vector diagram, with the magnitude of the current being represented by the density of the flow lines, the size of the spatial vectors, or by different colours. Apparatus 100 may cause tactile information about a change in one or more fluid dynamical properties of the body to be conveyed through the handlebars of a motorcycle, e.g. the left handlebar may vibrate to indicate that the driver should angle the windshield towards the left, with the frequency or intensity of the vibration indicating how far the windshield should be moved. In other embodiments, tactile information about navigation control may be conveyed, e.g. the left handlebar may vibrate to indicate that the driver should lean to the left to counteract the crosswind ahead. Apparatus 100 may cause the presentation of tactile information remotely from the body, for example via the left and right buttons of a computer mouse. Apparatus 100 may cause visual information about navigation control to be conveyed with respect to a kayak, e.g. a screen at the front of the kayak may show a visual representation of the wind field in a forthcoming fluid zone, e.g. ahead of or to the side of the kayak, as well as a suggested position for the rudder to be moved to in order to keep the kayak moving in a straight line.

In some embodiments, the visual, audio or tactile information is presented within an augmented reality setting. For example, a visual representation of the wind field ahead may be presented on a car windshield or over the eye region of a motorcycle rider's helmet. An audio simulation of the sound of the wind may be played through surround sound speakers in car.

In some embodiments, the apparatus 100 may continually perform the steps of receiving and processing a determined magnitude and direction of a current (e.g. a current magnitude and direction may be received and processed every 0.1 seconds, every 0.01 seconds, or faster than every 0.01 seconds). In other embodiments, the apparatus may only perform these steps if certain conditions are met, for examples if a weather forecast predicts windy conditions at/near the location of the body, a strong wind is detected at/near the location of the body, or if the body is located in/near an area which frequently has strong winds. For example, a driving assistance program at a motorcycle may perform the receiving and processing steps if the wind speed measured at the motorcycle exceeds a threshold.

Figure 8:
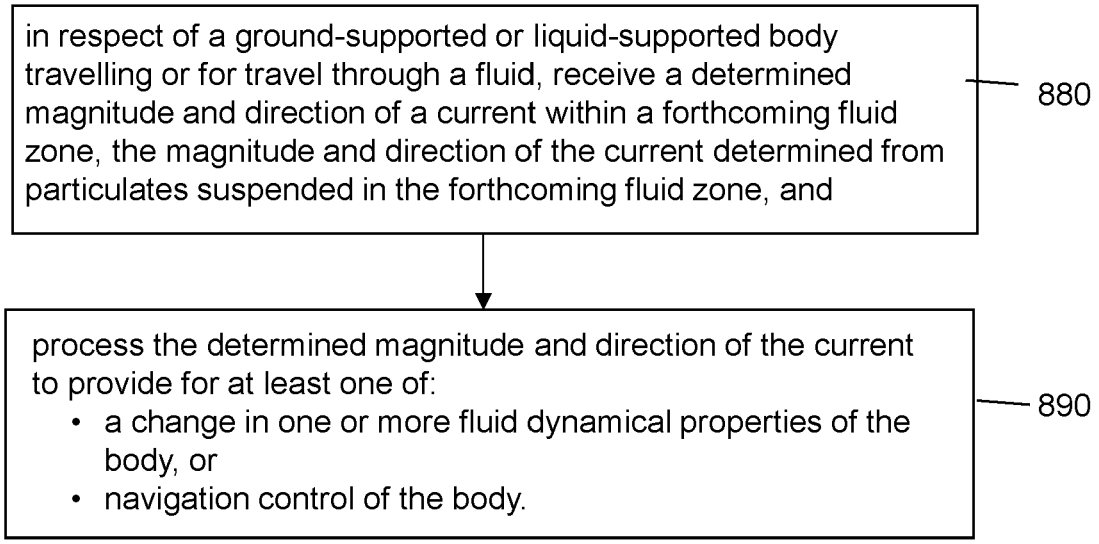
FIG. 8 illustrates schematically the main steps of a method described herein.

FIG. 8 shows the main steps 880-890 of a computer-implemented method described herein. The method comprises: in respect of a ground-supported or liquid-supported body travelling or for travel through a fluid, receiving a determined magnitude and direction of a current within a forthcoming fluid zone, the magnitude and direction of the current determined from particulates suspended in the forthcoming fluid zone 880, and processing the determined magnitude and direction of the current to provide for at least one of: (i) a change in one or more fluid dynamical properties of the body; or (ii) navigation control of the body 890.

Figure 9:
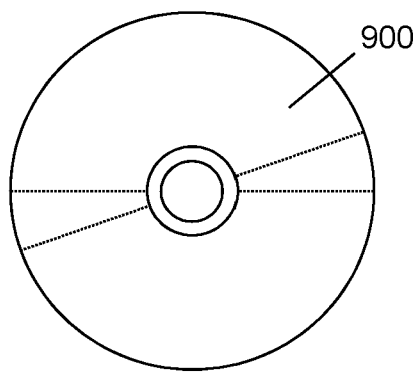
FIG. 9 shows an example computer-readable medium comprising a computer program configured to perform, control or enable the method of FIG. 8.

FIG. 9 shows an example computer-readable medium comprising a computer program configured to perform, control or enable the method of FIG. 8 or any method described herein. The computer program may comprise computer code configured to perform the method(s). In this example, the computer/processor readable medium 900 is a disc such as a digital versatile disc (DVD) or a compact disc (CD). In other examples, the computer/processor readable medium 900 may be any medium that has been programmed in such a way as to carry out an inventive function. The computer/processor readable medium 900 may be a removable memory device such as a memory stick or memory card (SD, mini SD, micro SD or nano SD card). In some example embodiments, the computer/processor readable medium 900 can be a non-transitory computer readable medium.

It will be appreciated to the skilled reader that any mentioned apparatus/device and/or other features of particular mentioned apparatus/device may be provided by apparatus arranged such that they become configured to carry out the desired operations when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality Such examples can allow a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

It will be appreciated that the term "circuitry" may refer to one or more or all of the following: (a) hardware-only circuit implementations (such as implementations in only analogue and/or digital circuitry) and (b) combinations of hardware circuits and software, such as (as applicable): (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in the claims. As a further example, as used in this application the term circuitry also covers and implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed examples may consist of any such individual feature or combination of features. In view of the foregoing description it will be evident to a person skilled in the art that various modifications may be made within the scope of the disclosure.

While there have been shown and described and pointed out fundamental novel features as applied to different examples thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or example may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   at least one processor; and
   at least one memory including computer program code;
   the at least one memory and the computer program code configured to, with the at least one processor, cause the apparatus to:
   in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and
   process the determined magnitude and direction of the current to provide for at least one of:
      (i) a change in one or more fluid dynamical properties of the body; or
      (ii) navigation control of the body.

2. The apparatus of claim 1, wherein the at least one memory and the computer program code are configured to, with the at least one processor, cause the apparatus at least to further perform:
   determine the magnitude and direction of the current within the forthcoming fluid zone from the particulates suspended in the forthcoming fluid zone.

3. The apparatus of claim 1, wherein the determined magnitude and direction of the current are determined using a time of flight camera to calculate the distance of the particulates from the body and the velocity of the particulates.

4. The apparatus of claim 3, wherein the particulates are detected by identifying orbs within at least one captured image of the forthcoming fluid zone.

5. The apparatus of claim 1, wherein the received determined magnitude and direction of the current within the forthcoming fluid zone have been corrected for the travelling velocity of the body with respect to the ground or liquid.

6. The apparatus of claim 1, wherein the fluid comprises air or water.

7. The apparatus of claim 1, wherein the particulates comprise at least one of: dust, sand, soot, smog, sea spray, rain drops, plankton or marine microorganisms.

8. The apparatus of claim 1, wherein the liquid-supported body is submerged in the liquid.

9. The apparatus of claim 1, wherein the apparatus is located in, on or is attached to the body.

10. The apparatus of claim 1, wherein the at least one memory and the computer program code are configured to, with the at least one processor, cause the apparatus at least to further perform at least one of:
    change one or more fluid dynamical properties of the body, or
    perform navigation control of the body.

11. The apparatus of claim 1, wherein the at least one memory and the computer program code are configured to, with the at least one processor, cause the apparatus at least to further perform:
    cause the presentation of visual, audio or tactile information about at least one of: the determined magnitude and direction of the current, a change in one or more fluid dynamical properties of the body, or navigation control of the body to enable a user to at least one of (i) change one or more fluid dynamical properties of the body or (ii) perform navigation control of the body.

12. The apparatus of claim 11, wherein the visual, audio or tactile information is presented within an augmented reality setting.

13. The apparatus of claim 1, wherein the at least one memory and the computer program code are configured to, with the at least one processor, cause the apparatus at least to further perform:
provide a computer-readable instruction to a controller to enable the controller to at least one of (i) change the one or more fluid dynamical properties of the body or (ii) perform navigation control of the body.

14. A method comprising:
in respect of a ground-supported or liquid-supported body travelling or for travel through a fluid, receiving a determined magnitude and direction of a current within a forthcoming fluid zone, the magnitude and direction of the current determined from particulates suspended in the forthcoming fluid zone, and
processing the determined magnitude and direction of the current to provide for at least one of:
(i) a change in one or more fluid dynamical properties of the body; or
(ii) navigation control of the body.

15. The method of claim 14, wherein the determined magnitude and direction of the current are determined using a time of flight camera to calculate the distance of the particulates from the body and the velocity of the particulates.

16. The method of claim 15, wherein the particulates are detected by identifying orbs within at least one captured image of the forthcoming fluid zone.

17. The method of claim 14, wherein the received determined magnitude and direction of the current within the forthcoming fluid zone have been corrected for the travelling velocity of the body with respect to the ground or liquid.

18. A non-transitory computer readable medium comprising program instructions stored thereon for performing at least the following:
in respect of a ground-supported or liquid-supported body travelling or for travel through a fluid, receive a determined magnitude and direction of a current within a forthcoming fluid zone, the magnitude and direction of the current determined from particulates suspended in the forthcoming fluid zone, and
process the determined magnitude and direction of the current to provide for at least one of:
(i) a change in one or more fluid dynamical properties of the body; or
(ii) navigation control of the body.

19. The non-transitory computer readable medium of claim 18, wherein the determined magnitude and direction of the current are determined using a time of flight camera to calculate the distance of the particulates from the body and the velocity of the particulates; and
wherein the particulates are detected by identifying orbs within at least one captured image of the forthcoming fluid zone.

20. The non-transitory computer readable medium of claim 18, wherein the received determined magnitude and direction of the current within the forthcoming fluid zone have been corrected for the travelling velocity of the body with respect to the ground or liquid.

* * * * *